United States Patent [19]

Welmer

[11] Patent Number: 5,491,805
[45] Date of Patent: Feb. 13, 1996

[54] APPARATUS FOR AUTOMATICALLY IDENTIFYING POINT-TO-POINT CABLE INTERCONNECTIONS AMONG A PLURALITY OF COMPONENTS WHICH ARE ALSO LINKED VIA A BROADCAST CONTROL CHANNEL

[75] Inventor: Harm J. Welmer, Redhill, United Kingdom

[73] Assignee: D2B Systems Company Limited, Redhill, England

[21] Appl. No.: 360,189

[22] Filed: Dec. 20, 1994

Related U.S. Application Data

[63] Continuation of Ser. No. 856,774, Mar. 24, 1992, abandoned.

[30] Foreign Application Priority Data

May 3, 1991 [GB] United Kingdom ............... 9109609

[51] Int. Cl.⁶ .................................................. G06F 13/00
[52] U.S. Cl. .................. 395/284; 395/800; 364/927.92; 364/927.95; 364/927.99; 364/941.8; 364/DIG. 2; 364/267.3; 364/267.8; 364/DIG. 1
[58] Field of Search ............... 370/85.11, 95.3, 370/60, 60.1; 364/267.3, 267.8, 927.92, 927.95, 927.99, 941.8; 395/80, 325, 284; 340/825.5

[56] References Cited

U.S. PATENT DOCUMENTS

| | | | |
|---|---|---|---|
| 4,428,046 | 1/1984 | Chari et al. | 395/325 |
| 4,570,162 | 2/1986 | Boulton et al. | 340/825.5 |
| 4,716,408 | 12/1987 | O'Connor et al. | 340/825.5 |
| 4,766,590 | 8/1988 | Hamada et al. | 370/56 |
| 4,818,985 | 4/1989 | Ikeda | 340/825.5 |
| 4,891,751 | 1/1990 | Call et al. | 395/800 |
| 4,998,247 | 3/1991 | Irvine–Halliday et al. | 370/94.1 |
| 5,003,533 | 3/1991 | Watanabe | 370/85.5 |
| 5,014,193 | 5/1991 | Garner et al. | 395/275 |
| 5,127,067 | 6/1992 | Delcoco et al. | 385/24 |
| 5,287,531 | 2/1994 | Rogers, Jr. et al. | 395/800 |
| 5,297,138 | 3/1994 | Black | 370/60 |
| 5,297,262 | 3/1994 | Cox et al. | 395/325 |

FOREIGN PATENT DOCUMENTS

| | | |
|---|---|---|
| 0257684 | 8/1987 | European Pat. Off. . |
| 2223114 | 9/1988 | United Kingdom . |

*Primary Examiner*—Paul V. Kulik
*Assistant Examiner*—Jack M. Choules
*Attorney, Agent, or Firm*—David Schreiber

[57] ABSTRACT

A system of domestic video apparatuses (10,12,14 etc.) are interconnected by video cables (64,66,68) and also by a serial data bus (D2B,16) having distributed control intelligence (20,22). Within each apparatus, signal generator and/or detector functions are defined, which can be activated and controlled via the bus (16). The video cable connections (64,66,68) between various plugs (26-1,2,3, 52-1,2,3, etc.) of the apparatuses (10,12,14) are identified automatically by interrupting signal transmission from all apparatuses involved then allowing a single transmission from an input to the connections and detecting the where the signal is output. By repeating the process with other all connections may be traced. The automatic identification of cable connections occurs without requiring additional conductors for cable detection signals.

12 Claims, 2 Drawing Sheets

APPARATUS FOR AUTOMATICALLY IDENTIFYING POINT-TO-POINT CABLE INTERCONNECTIONS AMONG A PLURALITY OF COMPONENTS WHICH ARE ALSO LINKED VIA A BROADCAST CONTROL CHANNEL

This is a continuation of application Ser. No. 07/856,774, filed Mar. 24, 1992 now abandoned.

BACKGROUND OF THE INVENTION

The invention relates to a system comprising a plurality of apparatuses for processing user information signals, each apparatus having an interface for the communication of control messages via a serial data channel and being independently addressable via said data channel bus, the apparatuses including:

- at least one first apparatus having at least one output connector for a given class of user information signal; and
- at least one second apparatus having at least one input connector for the given class of user information signal, the input connector being connectable via a cable to the output connector of the first apparatus;

the system including cable detection means for determining automatically which first apparatus, if any, is connected to the or each input connector of the second apparatus.

The invention further relates to apparatuses suitable for use as the first and/or second apparatus in such a system.

A system as set forth in the opening paragraph has been described in European Patent Application EP-A1-0 257 684 (PHN 11838). The system uses the serial data channel to enable automated detection of connecting cables between certain domestic video entertainment apparatuses and a switching device. Such automation is desirable in view of the increasing complexity of such systems, which should be hidden from the human user as far as possible. For the serial data channel, the system proposed in EP-A1-0 257 684 makes use of the Domestic Digital Bus (D2B) as standardized by the International Electrotechnical Commission (IEC), Geneva, published in their document number 1030 and previously available in draft form. Of course other wired or wireless data channels could be envisaged for the communication of control messages.

The system of EP-A1-0 257 684 exploits the widespread adoption of multi-wire cabling in domestic audio/video systems, based on the Euroconnector (SCART) standard, and uses certain conductors, additional to those which carry the user information signals (video signals in the example), to pass signals for the purpose of automatic cable detection. Once the network of interconnections has been identified control messages can be used to establish specific signal paths automatically to implement a user's desired function, for example as described in GB-A-2 223 114 (PHN 12678).

Unfortunately, the reliance of the proposed system on additional conductors necessitates an additional cost in the construction of apparatuses and cables for use in the system, by requiring special signal generating and detecting hardware which might not otherwise be required. Audio equipment in particular does not normally employ multi-wire cabling at all.

SUMMARY OF THE INVENTION

It is an object of the invention to enable the provision of an improved system of the type set forth in the opening paragraph, in particular to avoid unnecessary cost and complexity of the apparatuses, and to facilitate standardization.

The invention provides a system as set forth in the opening paragraph, characterized in that the cable detection means comprises:

- means addressable via the data channel as a control subdevice for generating a sequence of control messages for controlling said automatic determination, said sequence including first, second and third types of messages;
- signal generator means within each first apparatus for (i) in response to a message of the first type interrupting the supply of user information signals of the given class to the output connector(s) of the first apparatus, (ii) in response to a subsequent message of the second type selectively enabling the supply of such signals to just one output connector of the first apparatus, and (iii) in response to a message of the third type re-enabling the supply of such signals to the output connector(s) of the first apparatus to allow normal operation thereof; and
- detection means connectable to the or each said input connector of the second apparatus for indicating to the control subdevice whether a user-information signal of the given class is being received at that connector.

By provision of means for interrupting the normal user information signals flowing to the outputs and selectively enabling those signals to flow, the invention enables greater use of existing hardware resources for cable detection, avoiding additional expense. Moreover, the implementation of a signal generator function controllable via predetermined control messages enables standardization of behaviour among different makes and models of apparatus, while allowing the maker freedom in the actual hardware implementation of the functions.

Where the first apparatus has a plurality of output connectors, the control subdevice may be arranged to generate a sequence of messages of the second type, so as to cause the supply of signals sequentially to each output connector in turn.

In a preferred embodiment, each output connector of the first device is assigned a plug number unique among the connectors of that apparatus and each message of the second type comprises an instruction causing the signal generator means to supply a signal to one output connector specified in the message by means of its plug number, while blocking supply of signals to the other output connectors of the apparatus. The same plug numbers may be allocated for the purpose of creating signal paths in accordance with the methods described in GB-A-2 223 114 (PHN 12678), as mentioned above.

The given class of user information signal may for example be a composite video signal (such as a CVBS signal), which is the most likely to be already available and detectable in domestic video apparatus. In non-video apparatus, of course, an audio or other class of signal could be used. The control messages may even specify the signal classes so as to allow cable detection using different classes of signals at different points in the system, and to detect the presence of individual conductors in a multi-wire cable.

The invention further relates to a signal processing apparatus having an interface for communication of control messages via a serial data channel and at least one output connector for a given class of user information signal, the apparatus being independently addressable via the data channel, characterized in that the apparatus is suitable for use as the at least one first apparatus within a system according to the invention as set forth above, and in particular in that it includes means having the technical features of the signal generator means accordingly. Such an apparatus can be made and sold independently, with compatibility assured, provided that its behaviour in response to control messages of the first, second and third types is predictable in implementing the signal generator function. The physical implementation of these technical features need not be standardized, so that maximum use can be made of existing signal generating and switching components in each apparatus, avoiding additional expense. The apparatus may also include means addressable as and having the technical features of the control subdevice of the system.

Similarly, the invention provides a signal processing apparatus having an interface for communication of control messages via a serial data channel and at least one input connector for receiving a given class of user information signal, the apparatus being independently addressable via the data channel, characterized in that the apparatus is suitable for use as the second apparatus in a system according to the invention as set forth above, and in particular in that it includes detection means connectable to the or each such input connector for indicating to the control subdevice of the system whether a user information signal of the given class is being received at that connector. Again, existing detecting and switching components can be used to implement the detection means. Such apparatus may also include means addressable as and having the technical features of the control subdevice of the system.

The same apparatus may include the features necessary to act as either first or second apparatus, for maximum flexibility.

BRIEF DESCRIPTION OF THE DRAWINGS

Embodiments of the invention will now be described, by way of example, with reference to the FIGS. 1 to 3 of the accompanying drawings, in which.

DETAILED DESCRIPTION OF THE DRAWINGS

Figure 1:
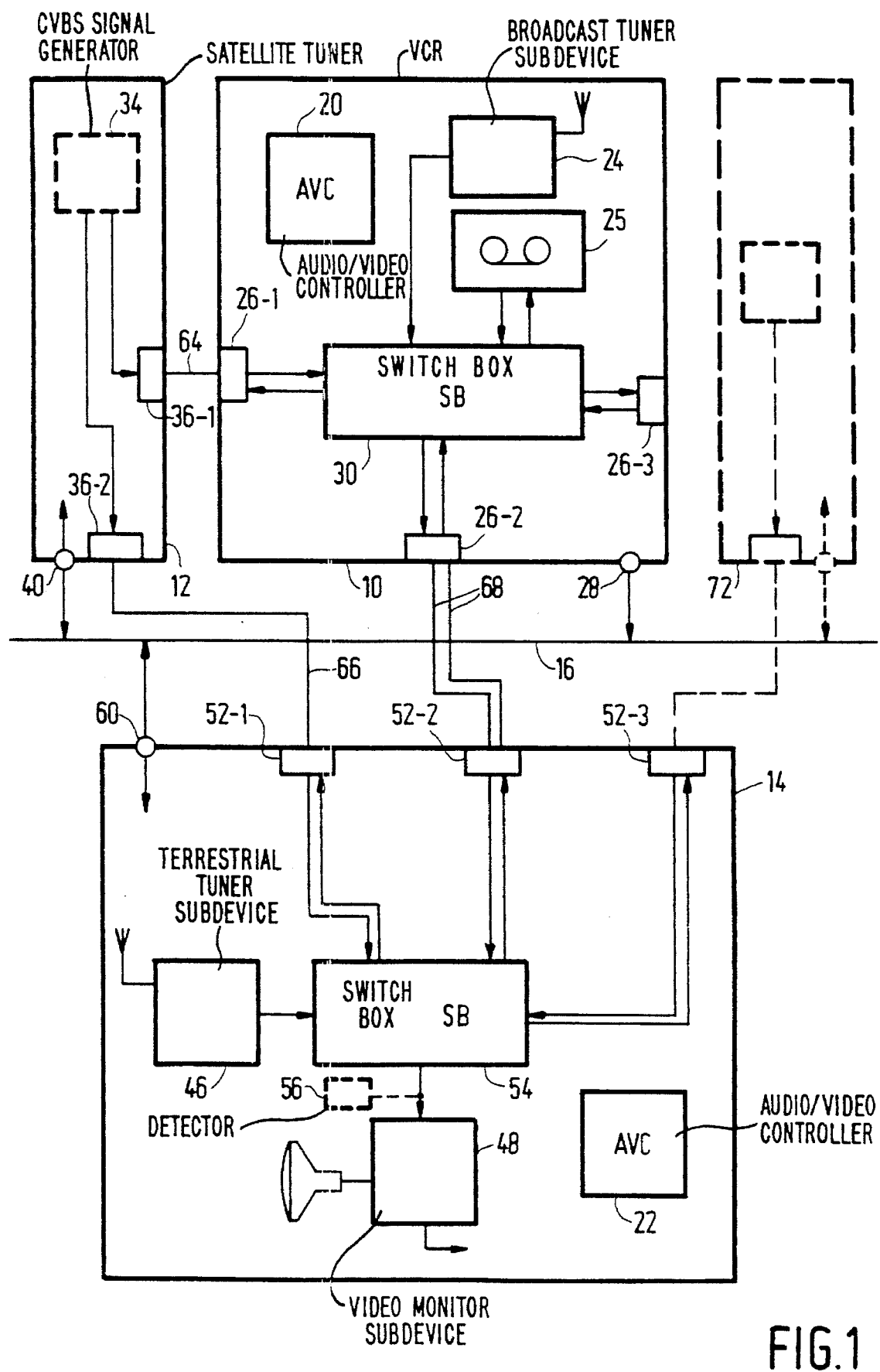
FIG. 1 shows a domestic video entertainment system in accordance with the present invention.

In the home entertainment system of FIG. 1, various apparatuses 10,12,14 are connected to a serial data channel comprising a bus 16. The apparatuses are, for the sake of example, video signal processing apparatuses, namely a video cassette recorder (VCR) 10, a satellite broadcast tuner 12 and a television receiver 14.

The serial data bus 16 is in this embodiment a Domestic Digital Bus (D2B) as standardized by the International Electrotechnical Commission (IEC), Geneva, published in their document number 1030 and previously available in draft form. D2B provides for distributed control of the bus, and allows commands and other messages to be uniquely addressed for specific "devices", such as the apparatuses 10, 12 and 14, and also for specific "subdevices" within each device.

Within each of the apparatuses 10, 12 and 14 there are shown some blocks addressable as D2B subdevices. The division of a device into subdevices is necessary only in a logical sense, that is to say, from the point of view of its behaviour relative to the D2B bus 16. In the physical implementation of the device, there may or may not be corresponding separate physical subdevices. In the embodiment shown, each of the two devices 10 and 14 includes one audio/video controller (AVC) type of subdevice 20 and 22 respectively. These provide the distributed control intelligence for the system, relaying D2B messages to and from subdevices and interacting with the user as necessary. The control logic of the AVC and some or all of the other subdevices within a device can even be integrated in a single microcontroller, without affecting the logical behaviour of the device with respect to the bus.

The VCR 10 includes, in addition to its AVC subdevice 20, a terrestrial broadcast tuner subdevice 24 and a record/replay deck subdevice 25. These subdevices 24 and 25 can act as sources of video signals, while the record/replay deck subdevice 25 can also act as a destination of video signals (during a recording operation). The exact nature of these signal source subdevices is not material to the present description. Furthermore, other subdevices relating, for example, to audio signals, user input/output and timed operation are present, but not illustrated or described herein, for the sake of brevity.

The VCR 10 has three external connectors 26-1, 26-2 and 26-3 which for the purposes of D2B messages are assigned respective plug numbers 1, 2 and 3. Each external connector 26-1 comprises a standard multi-wire audio/video connector such as a Euroconnector (SCART socket). In each Euroconnector 26-1 etc., pins 17 and 19 form an input and an output respectively for composite video (CVBS) signals, while other pins may or may not be used for RGB video signals and audio signals. In contrast to the system described in EP-A1-O 257 684, mentioned above, connection to the serial bus 16 is via a separate connector 28, rather than pins 10 and 12 of the Euroconnectors and the cable detection feature to be described is not dependent on any conductors of the Euroconnectors besides the CVBS conductors.

A switchbox subdevice 30 within the VCR 10 determines the pattern of interconnection among the external connectors 26-1 etc. and the internal sources and destinations of video signals in the subdevice(s) 24. The switchbox operates in response to command messages addressed to it via the bus 16 or generated by the local AVC subdevice 20.

Figure 2:
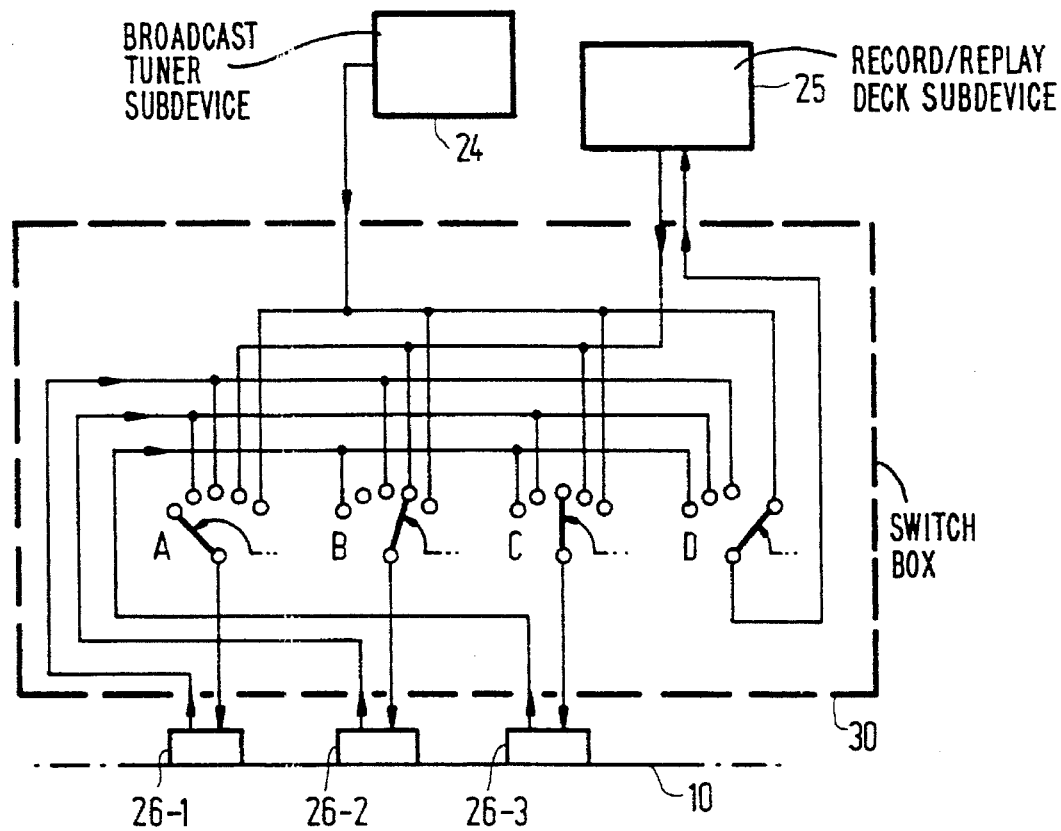
FIGS. 2 and 3 show in more detail parts of the system of FIG. 1.

FIG. 2 shows the switchbox subdevice 30 in more detail. Four multi-way switches 30A,B,C and D are provided to enable any output of the subdevice 30 to be connected to any of its inputs. Thus, for example, switch 30A enables the output conductor of connector 26-1 to be connected to the input conductor of connector 26-2 or 26-3, or to the CVBS output of tuner subdevice 24 or deck subdevice 25. Switches 30B and 30C act similarly for the output conductors of connectors 26-2 and 26-3 respectively as shown. Switch 30D allows the deck subdevice 25 to receive a CVBS signal from any connector 26-1,2 or 3 or from the tuner-subdevice 24. Each switch 30A,B and C also has an open position whereby CVBS signals can be prevented from reaching the respective connector 26-1,2,3.

Each switch is electronically implemented, or at least electronically controlled. Logic circuitry (not shown) is responsive to messages received by the switchbox subdevice 30 from the serial bus 16 or from the local AVC subdevice 20 (FIG. 1) to effect any desired pattern of interconnection between inputs and outputs. In a practical embodiment the permutations of connections available between the inputs and outputs may be more limited than those afforded by the arrangement shown. It will also be understood that subdevice 30 contains parallel sets of switches (not shown) for other classes of signal accompanying the CVBS signals which concern us here, for example audio signals.

Returning to FIG. 1, the satellite tuner 12 involves functional elements indicated generally at 34 which generate two CVBS output signals. These CVBS signals are supplied to external connectors 36-1 and 36-2 of the tuner 12. A separate connector 40 provides connection to the serial bus 16.

In addition to its AVC subdevice 22, the television receiver 14 includes a terrestrial tuner subdevice 46, which acts as a source of video signals, and a video monitor subdevice 48 (screen) which acts as a destination for video signals. Three external multi-wire connectors (Euroconnectors) 52-1, 52-2 and 52-3 are provided, and these are selectably interconnected with the subdevices 46 and 48 by a switchbox subdevice 54. Television receiver 14 also includes a separate connector 60 which provides connection to the serial bus 16. Television receiver 14 also includes a detector 56 for detecting when a CVBS signal is present at the input of video monitor subdevice 48, and for providing an appropriate logic signal to control circuitry of the receiver, including the AVC 22. Such a detector will in general be present already in a conventional television receiver, for example within subdevice 48.

Figure 3:
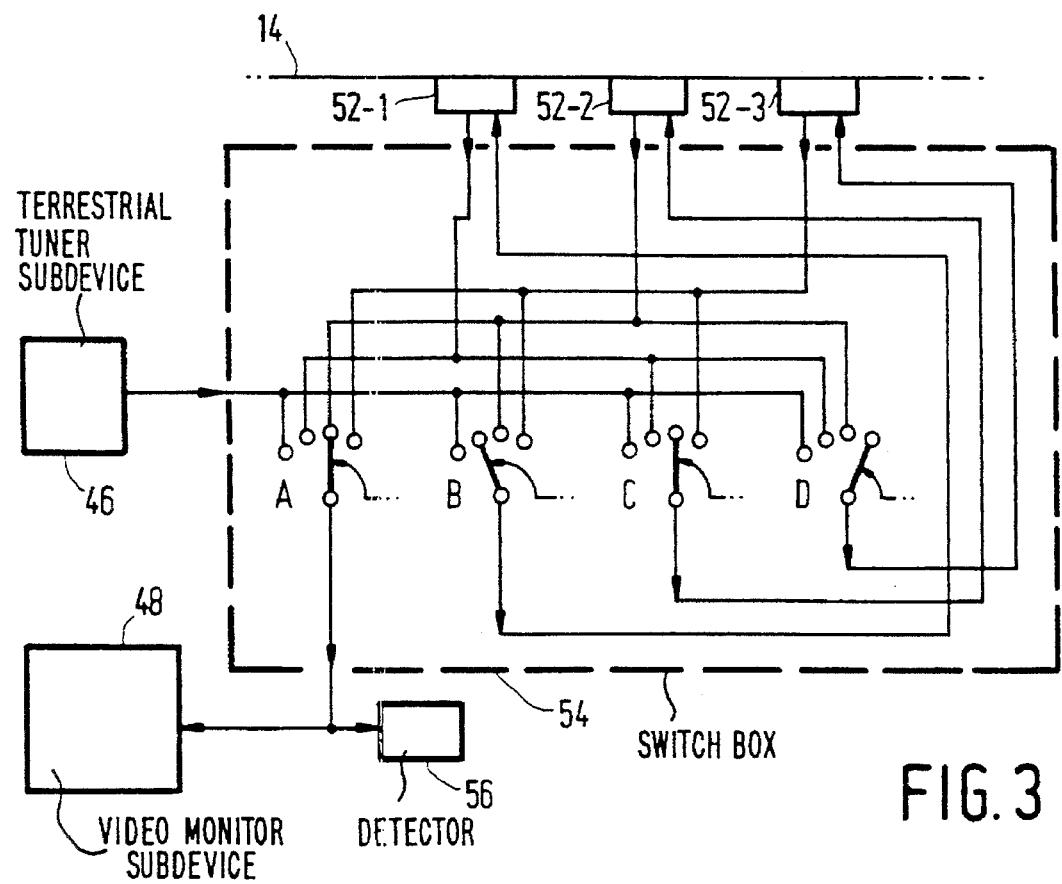

FIG. 3 shows the switchbox subdevice 54 of the television receiver 14 in more detail. Construction is of similar form to that of subdevice 30 in the VCR 10. Three CVBS signals are available from the input conductors of connectors 52-1,2 and 3, and a further CVBS signal is produced by tuner subdevice 46. A first multi-way switch 54A selects from these signals a signal to be applied to the input of video monitor subdevice 48. Three further multi-way switches 54B,C and D select the output signals available at connectors 52-1,2 and 3 respectively, as shown. Switches 54B,C and D each have open positions, whereby CVBS signals can be prevented from reaching the output conductors of connectors 52-1,2 and 3 respectively.

In the illustrative system configuration shown in FIG. 1, connector 36-1 of the satellite tuner 12 is connected to connector 26-1 of the VCR 10 by a cable 64 which includes a conductor for a CVBS signal at least. Similarly, a cable 66 extends between connector 36-2 of the satellite tuner 12 and connector 52-1 of the television receiver 14, while a further cable 68 extends from connector 26-2 of the VCR 10 to connector 52-2 of the television receiver 14. These connections enable a user to watch a satellite broadcast, to record a satellite broadcast or to watch a pre-recorded video cassette, provided that appropriate signal paths are made from the desired source of video signals through the system to the desired destination, using the cables and switchboxes provided.

Since the functional units of the apparatuses 10, 12 and 14 are addressable as D2B subdevices, either of the AVC subdevices 20 and 22 can take control of the bus and address commands to those subdevices. This is done for example by an AVC subdevice which has received a user command and requires control of subdevices in other devices to implement the user's wishes.

D2B message formats for controlling the basic functions of certain common subdevices are defined already in the IEC standard referred to above, while scope is left for defining not only new commands, but also request and reply messages that enable one D2B device or subdevice to interrogate another as to its properties and status. Each switchbox subdevice 30,54 can be controlled via the bus (or by its associated AVC subdevice 20,22) to connect its output data path(s) to a specified one of its input data paths. For example, if a user indicates to the television receiver device 14 that it is desired to watch a satellite broadcast channel, suitably addressed and coded D2B messages can be sent via the bus 16 to ensure: that both apparatuses 12 and 14 are active; that the satellite tuner 12 is tuned to the correct channel so that connector 36-2 carries the desired signal; and that the switchbox subdevice 54 is connecting connector 52-1 to the video monitor subdevice 48. An alternative path, through cables 64 and 68 is available, which would require activation and control of the VCR 10, but would also allow recording of the broadcast.

There are many ways of arranging these events with or without user intervention. For greatest user-friendliness, the whole process can be controlled by the AVC subdevice of the device which receives the user input. The information necessary for building the signal path can be obtained by a suitable series of D2B request messages to the relevant devices and subdevices. A suitable system for providing such control is described in GB-A-2 223 114 (PHN 12678). In that system no AVC subdevice requires knowledge of the complete system, but does require knowledge of its connections to its immediate neighbours in the network. That is to say, for example, that television receiver 14 requires to know which external connector of which device, if any, is connected to each of its external connectors 52-1,2,3. This knowledge could be obtained with user intervention, but is obtained automatically in the present embodiment in a manner to be described below. It is noted that automatic cable detection has been described previously in EP-A1-O 257 684. However, this known detection relies upon additional conductors in the multi-wire cables, and special detection circuitry and signal generating circuitry. The present invention, in contrast, relies only on the CVBS conductors and hardware that would be present in any typical apparatus of this class, as will be explained.

To enable cable detection, certain D2B messages are defined which can be sent by an AVC subdevice (for example 22) to a device such as the VCR 10, whose control logic is arranged to implement a signal generator function. A first command message [SigGenOn] causes the device to enter a signal generator mode in which all CVBS signals to external connectors are blocked. In the embodiment of FIGS. 1 to 3, the VCR 10 will respond to an appropriately addressed command [SigGenOn] by blocking all CVBS output signals to connectors 26-1, 26-2 and 26-3 of the VCR 10, for example by using the open positions of switches 30A,B and C. The tuner 12 will respond to a command [SigGenOn] by blocking CVBS output signals to connectors 36-1 and 36-2.

After issuing [SigGenOn] commands addressed to all devices in the system, the AVC subdevice 22 can therefore be sure that no CVBS input signals are being received at the external connectors 52-1, 52-2 and 52-3 of the television receiver 14. This can be verified by controlling switch 54A so that detector 56 is connected to the connectors 52-1, 52-2 and 52-3 in turn and observing that no CVBS signal is indicated by the detector 56.

To begin the detection of cables, the AVC subdevice 22 issues a second command [SigGenSet] to one of the signal devices, for example VCR 10. This command specifies one of the external connectors 26-1,2 or 3 of the device by reference to its plug number 1, 2 or 3 respectively, and causes that connector alone to be unblocked for the passage of a CVBS output signal by controlling the appropriate switch 30A,B or C. The deck subdevice 25 can be controlled at this point to act as a source of a CVBS signal. The AVC subdevice 22 then controls switch 54A again to poll the connectors 52-1, 2 and 3 in turn. If in one position of the switch the detector 56 now indicates that a CVBS signal is being received, then a cable connection has been identified. For example, if AVC 22 specifies plug number 2 in a

[SigGenSet] command addressed to VCR 10, the switches 30A,B,C and D in switchbox subdevice 30 will be in the positions shown in FIG. 2. Thus a CVBS signal will be available at connector 26-2, from where it is conducted via cable 68 to connector 52-2. This signal will be detected by detector 56 in the television receiver 14 when switch 54A is in the position indicated in FIG. 3. The AVC subdevice 22 then knows that plug 2 of the VCR 10 (connector 26-2) is connected (by cable 68) to plug 2 of television receiver 14 (connector 52-2).

In response to a further command [SigGenSet], this time specifying plug 1 (connector 26-1), the VCR 10 subdevice 38 will cause the signal to its plug 2 (26-2) to be blocked once more, (by setting switch 30B to the open position) and a CVBS signal to be supplied to plug 1 (26-1) instead (by controlling switch 30A). This signal will not reach the detector 56 of the television receiver 14, no matter what position switch 54A is in. From this, the AVC subdevice 22 can infer correctly that there is no cable which extends (directly) between connector 26-1 and any connector of the television receiver 14. This inference is reliable only because the signal generator function in the satellite tuner 12 has previously been activated by a [SigGenOn] command to block all CVBS outputs of the tuner 12. Otherwise, a signal path via the tuner 12 might have caused the AVC subdevice 22 to infer (incorrectly) a direct cable connection between connectors 26-1 and 52-1.

Addressing a further [SigGenOn] command to VCR 10 blocks the outputs 26-1,2 and 3 of the VCR 10 once again. After this, a sequence of [SigGenSet] commands are addressed to the satellite tuner 12, to enable detection of cables connecting the apparatuses 12 and 14, that is to say cable 66 in the embodiment shown.

At the end of this sequence, a command [SigGenOff] is issued to both VCR 10 and tuner 12, which then become able to supply CVBS signals for normal operation. The television receiver 14 then has a complete list of its connections to the nearest neighbour apparatuses 10 and 12, as required for establishing signal paths by the methods of GB-A-2 223 114 mentioned above.

In order to build up a table of connections for the VCR 10, it would be possible for AVC subdevice 22 to implement a more complex sequence of commands, thereby using the detector 56 to detect, for example, cable 64. To avoid this complication, however, it is preferable (and in practice likely) that the VCR 10 has its own detector, for example at the CVBS input of record/replay deck subdevice 25. Using the tuner subdevice 46 (for example) as a source of a CVBS signal, the television receiver 14 can implement signal generator functions in response to commands [SigGenOn] etc., controlling switches 54A,B,C,D accordingly. Thus, while the apparatuses 10, 12 and 14 as described above constitute respectively first, first and second apparatuses of the system as referred to in the introduction above, it is possible and indeed preferable that each device includes both detection means and a signal generator means, so that it can act both as a first apparatus and as a second apparatus. In this way, each apparatus can identify its own nearest neighbour connections with maximum certainty and minimum processing effort.

For additional flexibility, a request message [SigGen?] is defined, by means of which a device can be interrogated as to the present state of its signal generator means. The reply to such a request message will indicate (i) whether the signal generator is active (cable detection in progress, signals blocked) or inactive (normal operation) and (ii) if the signal generator is active, whether all signals are blocked or whether one signal is being generated on a connector. In the last case, the plug number of the connector in question can be given in the reply, and possibly also the class of signal being generated.

It may be noted that, with additional processing effort, the system can even cope to a limited extent with the inclusion of apparatuses (72, shown dotted) having neither signal generator means nor signal detectors. If necessary, guided user intervention could play the role of a signal generator means.

It will be appreciated by those skilled in the art that, in terms of hardware, the detection means and the signal generator means need constitute only a very little addition to the cost of the system shown in the Figure, chiefly in the provision of additional control logic and/or software. In other words, the definition of certain standardized logical features such as the signal generator means allows cable detection to be automated in a compatible and reliable manner, while leaving freedom of design in the physical implementation within each apparatus, in particular to reduce to a very low level the additional cost involved.

The embodiment described is of course not the only possible way of carrying out the invention. For example, the signal generator means could be addressable via the bus as a separate subdevice, the detector could be interrogatable by request messages and so forth. The supply of signals to the output connectors can be blocked by disabling the source (25) rather than by use of open positions in the switches 30A,B and C. The person skilled in the art will also appreciate how the invention can be adapted to cope with classes of user information signals other than CVBS, and with other data channels for the communication of control messages, if desired. For example audio-only apparatuses can use their existing audio signal outputs for cable detection. Clearly the invention is applicable to optical fibre cables and other point-to-point signal paths, as well as to electrical cables.

From reading the present disclosure, other variations will be apparent to persons skilled in the art. Such variations may involve other features which are already known in the design, manufacture and use of home entertainment systems, local bus communication systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A system comprising a plurality of apparatuses for processing user information and being arranged with inputs and outputs that have dedicated point-to-point interconnections for communicating such user information between said apparatuses, said apparatuses being furthermore linked by a serial control channel, said system having cable detection means addressable via said serial control channel for automatically detecting said point-to-point interconnections through generating a sequence of a first message, a subsequence of second messages, and a third message, each said input being provided with a detector for such user information, said first message interrupting any supply of user information to any said interconnection, each message of said subsequence of second messages enabling the supply of user information to one interconnection unique to that message while interrupting any further supply to other interconnections and thereby activating at most one unique detector, a time-sequential detection pattern of all detectors thus identifying said interconnections, said third message re-enabling the supply of user information to all said interconnections.

2. A system comprising a plurality of point-to-point interconnected apparatuses for processing user information signals, each apparatus having an interface for the communication of control messages via a serial data channel and being independently addressable via said data channel, the apparatuses collectively including:

a plurality of output connectors for a given class of user information signal; and a plurality of input connectors for the given class of user information signal, each input connector being connected via a dedicated connection cable to one of the output connectors;

the system including cable detection means for determining automatically which of said input connectors is connected to each one of said output connectors, wherein the cable detection means comprises:

a control subdevice for sending a sequence of control messages via said data channel to an addressed one of said apparatuses for controlling said automatic determination, said sequence including first, second and third types of messages;

signal generator means within each of said apparatuses having at least one of said output connectors for (i) in response to a message of the first type interrupting the supply of user information signals of the given class to the output connector(s) of said each apparatus, (ii) in response to a subsequent message of the second type selectively enabling the supply of such user information signals to just one output connector of said each apparatus, and (iii) in response to a message of the third type re-enabling the supply of such user information signals to the output connector(s) of said each apparatus to allow normal operation thereof; and detection means connectable to each said input connector for indicating to the control subdevice which of said input connectors is receiving a user information signal of the given class in response to a message of the second type.

3. A system as claimed in claim 2 wherein at least one of the apparatuses has a plurality of output connectors and wherein the control subdevice sends a sequence of messages of the second type to said at least one apparatus, so as to cause user information signals to be supplied sequentially to each output connector of said at least one apparatus in turn.

4. A system as claimed in claim 3 wherein each output connector of at least one of the apparatuses is assigned a plug number unique among the connectors of that apparatus and wherein each message of the second type comprises an instruction causing the signal generator means to supply a signal to one output connector specified in the message by means of said plug number assigned to said output connector, while blocking supply of user information signals to the other output connectors of that apparatus.

5. A system as claimed in claim 2 wherein each output connector of at least one of the apparatuses is assigned a plug number unique among the connectors of that apparatus and wherein each message of the second type comprises an instruction causing the signal generator means to supply a signal to one output connector specified in the message by means of said plug number assigned to said output connector, while blocking supply of user information signals to the other output connectors of that apparatus.

6. A system as claimed in claim 5, wherein the given class of user information signal is a composite video signal.

7. A system as claimed in claim 2, wherein the given class of user information signal is a composite video signal.

8. A system as claimed in claim 7, wherein the signal generator means comprises a source of signals of the given class, switching means interposed between the signal source and each of said output connectors, and means for controlling the switching means in response to messages of the first, second and third types.

9. A system as claimed in claim 2, wherein the signal generator means comprises a source of signals of the given class, switching means interposed between the signal source and each of said output connectors, and means for controlling the switching means in response to messages of the first, second and third types.

10. A system as claimed in claim 9 further including means addressable as the control subdevice of the system.

11. A system as claimed in claim 2, wherein the detection means includes a detector having an input for a signal of the given class, switching means interposed between the input of the detector and the input connectors of the apparatus and control means for controlling the switching means so as to connect the detector input sequentially to each input connector.

12. A system as claimed in claim 11 further including means addressable as the control subdevice of the system.

* * * * *